United States Patent [19]
Niebling, Jr. et al.

[11] Patent Number: 5,108,530
[45] Date of Patent: Apr. 28, 1992

[54] METHOD OF PRODUCING A DEEP-DRAWN FORMED PLASTIC PIECE

[75] Inventors: Curt Niebling, Jr., Penzberg; Joachim Wank, Dormagen, both of Fed. Rep. of Germany

[73] Assignee: Bayer Aktiengesellschaft, Fed. Rep. of Germany

[21] Appl. No.: 444,200

[22] Filed: Dec. 1, 1989

[30] Foreign Application Priority Data

Dec. 1, 1988 [DE] Fed. Rep. of Germany ....... 3840542
Feb. 20, 1989 [DE] Fed. Rep. of Germany ....... 3905177

[51] Int. Cl.⁵ ............................................. B32B 31/14
[52] U.S. Cl. .................................. 156/245; 156/280; 264/500; 264/510; 264/544
[58] Field of Search ................ 156/245, 285; 264/500, 264/510, 544

[56] References Cited

U.S. PATENT DOCUMENTS 1,857,034 12/1968 Knox .................................. 264/544
4,931,325 6/1990 Corradini et al. ................... 264/544

*Primary Examiner*—Caleb Weston
*Attorney, Agent, or Firm*—Connolly & Hutz

[57] ABSTRACT

A method of manufacturing a deep-drawn formed plastic piece comprises providing a cold-stretchable sheet material with a coating selected from a group of an ink film, an ink imprint, a vacuum evaporated metallic thin film, and an electrically conductive varnish film. The coated sheet is heated with a fluid pressure medium which has a fluid medium pressure of more than 20 bars, and at an operating temperature lower than the softening temperature of the sheet material, in order to deform the sheet material isostatically to obtain the deep-drawn formed coated plastic piece.

20 Claims, 7 Drawing Sheets

METHOD OF PRODUCING A DEEP-DRAWN FORMED PLASTIC PIECE

FIELD OF THE INVENTION

The present invention is directed to a method of producing a deep-drawn, preferably multi-colored formed plastic piece, in which a fluid pressure medium is applied to cold-stretchable sheet material at an operating temperature and the sheet material is isostatically formed. Furthermore, the invention is directed to an apparatus for performing the method. The deep-drawn pieces obtained by the invention, which may selectively be reinforced with further plastic material, typically exhibit multi-colored and/or transparent wall sections and may be used, for example, as a housing part, as a cover for luminous indicators or instruments, as an illuminated push or switch button, as a heater screen, as an instrument panel (section) or as a taillamp lens in automotive vehicles.

BACKGROUND OF THE INVENTION

Typically, deep-drawn formed plastic pieces are obtained by vacuum thermoforming or pressure thermoforming by forming sheets or panels from termoplastic materials which, prior to forming, have been heated to a temperature above the softening temperature of the material. For the pressure thermoforming method, a working medium pressure of less than 6 bars is usual and quite sufficient. Heating to at least the softening temperature requires energy and time. The formed product can be removed from the mold only in a dimensionally stable state, which necessitates cooling of product and mold. Heating prior to, and cooling after each forming step requires comparatively long cycle times.

DE-A1-37 33 759 discloses a method of producing a container from a deep-drawable thermoplastic laminated sheet of plastic material, preferably polypropylene, with a polyvinylidene chloride layer. The laminated sheet is initially heated to a temperature in excess of 130° C. in order to reduce the degree of crystallization of the polyvinylidene chloride, and subsequently it is quenched to a temperature of less than 75° C., and directly after quenching it is vacuum thermoformed by deep drawing. Although the cooling rate should be as high as possible, a period of between 15 and 300 seconds is recommended for quenching and deep drawing.

In the method according to DE-A1-37 27 926, flat and/or preformed panels of thermoplastic materials which are unidirectionally or multidirectionally reinforced with short or long fibers are formed as intermediates by means of compression molding in a heatable mold comprising a cavity and a cover. A release film having good stretchability is placed between the intermediate and the cover, the release film having a higher resistance to dimensional change than the intermediate. Forming is effected indirectly, that is, the compressed fluid acts on the release film, and the latter forms and presses the intermediate against the mold cavity. The release film has a higher resistance to dimensional change and resists such change to a greater degree than the intermediate. Under these conditions, a pressure of between 2 and 20 bars is preferably provided with the gaseous or liquid pressurized fluid. Application of pressure and temperature preferably lasts until the soft thermoplastic intermediate and the release film have molded themselves against the mold contours.

SUMMARY OF THE INVENTION

It is a main object of the present invention to provide a quicker and/or more economic method of deep-drawing plastic sheets or panels, with which selectively also thermosetting materials can be processed. Moreover, in accordance with the novel method it shall also be possible to form sheets provided with a coating such as a colored imprint, the sheets after deep drawing being provided with an accurately located and well-defined pore-free and crack-free coating.

Furthermore, a mold for performing the novel method is to be provided.

The solution of the specified object in accordance with the present invention is one in which forming is conducted at an operating temperature below the softening temperature of the sheet material and at a fluid medium pressure of more than 20 bars.

When imprinted and/or coated sheets are subjected to forming, the printing ink or the coating is preferably selected from a material which can be formed at the operating temperature and which is particularly elastic and/or softenable.

Subsequent to the high-pressure forming step according to the present invention, additional and preferably transparent synthetic resin may be injection-molded onto the deep-drawn piece. In this way it is possible to use thinner sheets for the forming step, which are better adapted to forming, and to achieve the required rigidity by reinforcing injection. Also, the colored imprint or coating may be sandwiched between two layers of plastic material.

The high-pressure forming method according to the present invention permits a more rapid sequence. Because of the increased effort it was not obvious to the skilled man to operate at such high pressures. Also, it was surprising to the skilled man that the abrupt forming due to the application of high pressures does not result in any damage to the plastic sheet. It is a further significant advantage of the novel method that thermosetting plastic sheets as well as and highly oriented highly crystalline plastic sheets, which cannot be formed with the known methods requiring thermal softening (thermoforming, drop forming), can also be formed.

Although the high-pressure forming according to the present invention is performed below the softening temperature of the sheet material, the cold-stretchable sheet material flows substantially in a controlled and uniform manner. The influences of edges, corners and other wall portions of a mold on the plastic flow are substantially reduced. The sheet is formed into the mold cavity like a balloon with uniform stretching of all non-clamped sheet portions. Preferably, forming takes place within fractions of a second and is determined primarily by the molecular mobility and molecular structure which is largely homogeneous across the entire sheet. The increased area is obtained essentially due to molecular re-arrangement on a molecular plane. The degree of forming is limited by the percentage elongation at break of the respective plastic sheet. The sheet materials which are preferably used can readily be subjected to a twofold increase in area (100% increase in area). It is preferred that with the high-pressure forming method of the present invention the increase in area caused by deep drawing should not exceed 120% of the formable sheet area.

Typical sheet materials exhibit a semi-crystalline structure and comprise amorphous portions. The crystallites have a specific known melting temperature or melting temperature range $T_s$, respectively. Upon heating above the crystallite melting temperature the entire material will at any rate soften and start to flow. The softening temperature of the respective material has been reached or exceeded. Above the softening temperature, simple material transport by flowing the material will be possible. Injection molding methods utilize this facilitated material transport and typically operate at temperatures above the softening temperature. The softening temperatures of the most important useful sheet materials are either known or can be easily determined, for instance as the VICAT softening temperature.

The high-pressure forming method according to the present invention is conducted below the softening temperature, preferably at least 40° K. and more below the softening temperature, of the respective sheet material. The softening temperature of bisphenol-A-based polycarbonates (such as MAKROLON or MAKROFOL sheets) is approximately at or above 150° C. Injection molding of these polycarbonates is typically conducted at a temperature above 200° C. As compared thereto, the isostatic high-pressure forming of such polycarbonate sheets may be performed at room temperature.

Due to their proportion of amorphous components, most of the semi-crystalline plastic materials have a glass transition temperature ($T_g$) below their softening temperature. When the glass transition temperature is exceeded, the molecular mobility of the amorphous proportions is increased because previously "frozen" degrees of freedom of movement and rotation are "thawed". Above the glass transition temperature the macromolecules of the polymers and plastic materials are more easily able to rearrange themselves, which is expressed in an increased (macro) Brownian movement. The plastic material adopts the "vitreous state", as it is called. The glass transition temperature ($T_g$) of a sheet material depends on various factors such as the chemical constitution (proportion of polar groups), the spatial configuration (atactic or syntactic material), the pretreatment (the content of vacancies), the content of copolymer components and possibly a plasticizer content. The glass transition temperature can be determined especially by way of dynamic methods such as, for example, measurement of the temperature-dependent variation of mechanical/dynamic properties (such as the loss modulus). Moreover, for the most important sheet materials presently considered, the glass transition temperature ($T_g$ or $T_g(dyn)$) is known.

There may be a substantial difference between the softening temperature and the glass transition temperature of a plastic material. Polyethylene terephthalate, for example, has a softening temperature of about 260° C. and a glass transition temperature (dependent on the crystallite content) of between about 65° and 81° C.

High-pressure forming according to the present invention may be conducted below the glass transition temperature of the sheet material. It is preferred to operate above the glass transition temperature, because above the glass transition temperature the resistance to a change of shape is reduced and plastic deformation is facilitated. "Plastic drawing" of the sheet material as required for deep drawing can be performed more easily. Since forming occurs under the condition of "plastic flow", the recovery capacity of the formed plastic material at room or performance temperature is reduced.

In case of a sheet provided with a colored imprint, the operating temperature preferably is between 80° and 130° C. The ink carriers which are used in many inks, such as screen-printing inks, are solid below 80° C. so that a stable permanent color imprint is provided at the typical expected performance temperatures. However, many ink carriers are sufficiently deformable at temperatures between 80° and 130° C. to go along with the change of shape and increase in area of the sheet material occurring in the high-pressure forming method of the present invention, and without any detrimental results (no flaking, no forming of cracks or pores). Inks, especially screen-printing inks whose pigment carriers can be deformed above 80° C., are available at least from specialized dealers. Inks with a plastic pigment carrier, for example on the basis of polyurethane, are well suited. Also, the high-pressure forming method according to the present invention may also be performed with sheets that are provided with a different coating, for instance with a vacuum evaporated metal thin film or an electrically conductive varnish film.

A "cold-stretchable" sheet material here means a sheet material which can be significantly stretched biaxially at room temperatures, preferably to an increase in area by at least 100%. Surprisingly, the high-pressure forming of many common cold-stretchable sheet materials can already be performed at room temperature. Within the scope of the invention high-pressure forming is preferably conducted at room temperature because this requires reduced effort. Any heating and cooling of the mold can be omitted.

Forming of the sheet material is preferably conducted at a fluid medium pressure of between 50 and 300 bars, and a pressure of between 60 and 250 bars is especially preferred. The higher pressures should be considered, particularly in case of a larger mold area, sharper definition of outlines, and/or greater thickness of the material. For example, a fluid medium pressure of at least 20 bars in case of a polycarbonate sheet with a thickness of 50 μm, a fluid medium pressure of 50 bars with a thickness of 100 μm, and a fluid medium pressure of 100 bars and higher with a thickness of 200 μm and more have proven satisfactory factory and result in each case in a sharp-edged copy of the mold cavity.

In high-pressure forming according to the invention, the fluid pressure medium is applied immediately and directly to the sheet material. Within fractions of a second after opening of an inlet valve for the pressure medium the sheet is molded against the mold cavity and/or any protruding mold portion and the forming operation is completed. For certain less strong sheet materials, for example cellulose esters which are susceptible to tearing or breaking, a delayed pressure build-up by means of restricted supply of pressure medium may be preferred. With larger multiple molds complete forming of the entire sheet may also take somewhat longer. In these cases forming is likewise completed within less than 2 seconds.

The typically used liquids and gases may be employed as fluid pressure media. With regard to costs, availability and simple handling, it is preferred to use compressed air. An inert gas such as nitrogen, helium or argon are likewise suitable in individual cases. When the pressure medium meets the plastic sheet to be formed, which is typically flat, the medium should at least be at the operating temperature. Higher medium temperatures are also conceivable, provided they do not result in a softening of the sheet material.

Preferably sheets having a thickness of between 40 and 2000 µm can be subjected to forming in accordance with the present invention. With greater sheet thicknesses the abrupt forming frequently causes embrittlement of the material. In the case of sharp-edged contours, the difference between the radii of curvature between inner and outer surface may become excessive and may frequently cause destruction of the material. It is especially preferred to use sheets having a film thickness of between 50 and 500 µm. Particularly good results have been achieved, for example, with polycarbonate sheets ("MAKROLON" or "MAKROFOL" produced by BAYER AG) having a film thickness of between 100 and 200 µm. For the most important applications, a film thickness of 500 µm already yields a self-supporting deep-drawn piece.

In accordance with the present invention it is possible simultaneously to form a multi-layer sheet assembly in a single operation. Frequently, a two-layer arrangement is suitable in which a colored imprint or other coating is provided on an inner surface of a sheet web. The second layer may comprise a protective layer such as a two-component varnish or, preferably, another sheet web. On the inner surface of the other, imprint-free sheet a void-free adhesive layer such as a hot-melt adhesive may be applied. The sandwich assembly is formed in a single operation in which the colored imprint or coating does not contact the mold. On the deep-drawn formed plastic piece the colored imprint or coating is protected by being provided "internally" between respective layers of sheet material. When the concave inner wall of such a two-layer formed piece is injection-reinforced with molten synthetic resin, the colored imprint or coating is not damaged although the further resin is applied at a temperature which is typically by 100° K. and more above the forming/softening temperature of the ink carrier of the ink imprint. Under the injection conditions the adhesive layer such as the hot-melt adhesive will also be cured.

High-pressure forming in accordance with the present invention can be performed with both thermoplastic and thermosetting sheet materials. The choice depends mainly on the cold-formability (formability at room temperature) and the recovery capacity after completed forming. Using cold-stretchable sheet materials is preferred which have little recovery capacity at room and performance temperature. Any remaining slight tendency to recover may be compensated by injection-reinforcing the deep drawn piece with further synthetic resin. For many applications it is preferred to provide sheet materials having good to high transparency. Preferably polycarbonates (such as the MAKROLON types sold by BAYER AG), polyesters and in particular aromatic polyesters (such as PA 6 or PA 66 types, high-strength aramide sheets), polyimides (for example the sheets sold under the trade name KAPTON based on poly(diphenyloxide pyromellitic imide) and polyarylates have proven satisfactory and their use is preferred. Particularly good results were achieved with sheet materials from polycarbonates (MAKROLON), polyalkylene terephthalates and polyimides (KAPTON). Within the scope of the present invention it is especially preferred to process such materials. Organic thermoplastic cellulose esters, especially the acetates, propionates and acetobutyrates thereof (examples for such sheet materials are sold under the trade name CELLIDOR by BAYER AG) are also suitable and may be used in special cases. The somewhat lower mechanical strength can be compensated by a lower fluid medium pressure and/or delayed pressure build-up for forming. Pure polyolefins such as polyethylene or polypropylene are less suited because they exhibit a high recovery capacity. On the other hand, polyfluorohydrocarbons, especially the copolymers known as FEB made from tetrafluoroethylene and hexafluoropropylene, are well suited. FEB sheet is also available as a transparent sheet.

In accordance with a special embodiment of the novel method, forming may be conducted against a resiliently supported wall portion, especially against a resiliently supported bottom of the mold cavity. This method step is advantageous for forming large-area plastic sheets with a tendency to slack, because in that case the sheets will remain supported during the entire forming step.

High-pressure forming in accordance with the present invention can be performed in molds which are basically known from pressure thermoforming and which in the present case are adapted to the substantially higher medium pressure Typically, one mold half comprises the mold cavity and the other half is formed by a pressure bell, the pressure chamber of which is communicated via a pressure conduit with an air compressor.

Preferably, the bottom of the mold cavity consists of a spring-mounted plate which in the unloaded condition takes a position to support the unformed plastic sheet and in the spring-loaded condition takes a position to expose the maximum volume of the mold cavity.

Alternatively, the one mold half may be surrounded by a spring-mounted frame on which the sheet to be formed is clamped. When the frame is lowered relative to the mold, the sheet is drawn across the mold half and stretched. The cycle time required for forming can be reduced still further. In this case the mold is a positive or negative mold and/or comprises raised portions and cavities.

A further novel and possibly additional embodiment provides that an air accumulator is disposed in the pressure conduit between the pressure bell and compressor. The forming process is promoted by this buffer unit.

The mold depths depend on the mold area and should not exceed 50 mm in most cases mold depths of less than 20 mm are preferable. Within these limits it is preferred to match mold area(s) and mold depth with each other such that the increase in area caused by the deep drawing operation does not exceed 120% of the formable sheet area. It is also possible to work with multiple molds which comprise a number of cavities, for example 32 cavities and more.

Below, the invention will be explained in detail with reference to preferred embodiments thereof and to the drawings, in which:

BRIEF DESCRIPTION OF THE DRAWINGS

FIG. 1 shows a mold 1 which is in communication with a multi-stage compressor 4 for producing compressed air at a pressure of 20 to 300 bars through a compressed-air line 2 having an air accumulator 3 disposed therein. The mold 1 comprises a lower half 5 and a cavity 6 therein and an upper half 9 configured as a pressure bell 7 including a pressure chamber 8. The bottom 10 of the mold is constituted by a vertically movable plate 11 which is supported by springs 12 and comprises guide bolts 13 sliding in guide bores 14. In the unloaded state, the plate 11 takes the position shown on the left, in which the bottom 10 is coplanar with the split level 15 due to the stops 16 which limit the elevation of the plate 11. When the fluid medium is applied to the pressure chamber 8 the plastic sheet 18 disposed between aligning pins 17 will be formed while the plate 11 is moved back under the action of the pressure and the springs 12 are compressed until the plate abuts and takes the position shown on the right. The mold 1 is disposed in a closing unit indicated by symbolic arrows. The closing unit must be designed to accommodate the forces occurring by the application of pressure to the mold. The heating channels of the mold are referenced as 19.

FIG. 2 shows another mold 1 comprising a stationary lower half 5 and a movable upper half 9 configured as a pressure bell 7. The lower half 5 includes both cavities 6 and raised portions 6'. The lower half 5 is surrounded by a vertically movable frame 20 supported by springs 21. The sheet 18 to be formed is fixed by aligning pins 22 projecting from the top of the frame 10. When the upper half 9 is lowered, the sheet 18 to be formed is initially clamped between mold half 9 and frame 20. Upon further joint lowering of mold half 9 and frame 20 the sheet 18 is drawn across the raised portions 6' of the half 5 and stretched. Subsequently, compressed air is introduced into the pressure bell 7 and the sheet 18 is molded accurately against the entire contour of the half 5. When the half 9 is elevated, the springs 21 shift the frame 20 relative to the mold half 5 and the formed sheet is released from the mold half 5.

EXAMPLE 1

Figure 1:
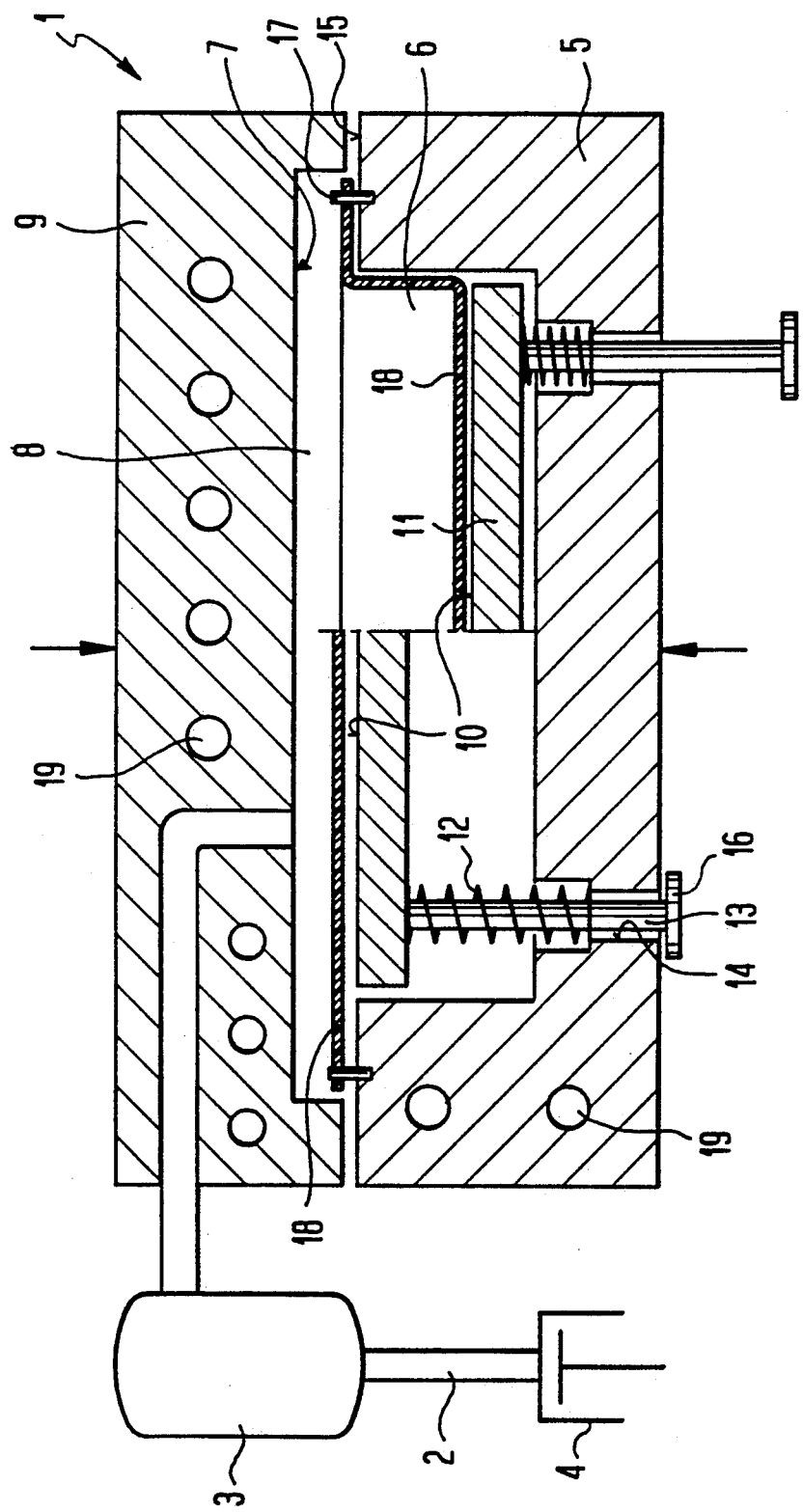
FIG. 1 is a schematic sectional view of a first embodiment of a mold for performing the high-pressure forming method according to the invention.
Figure 2:
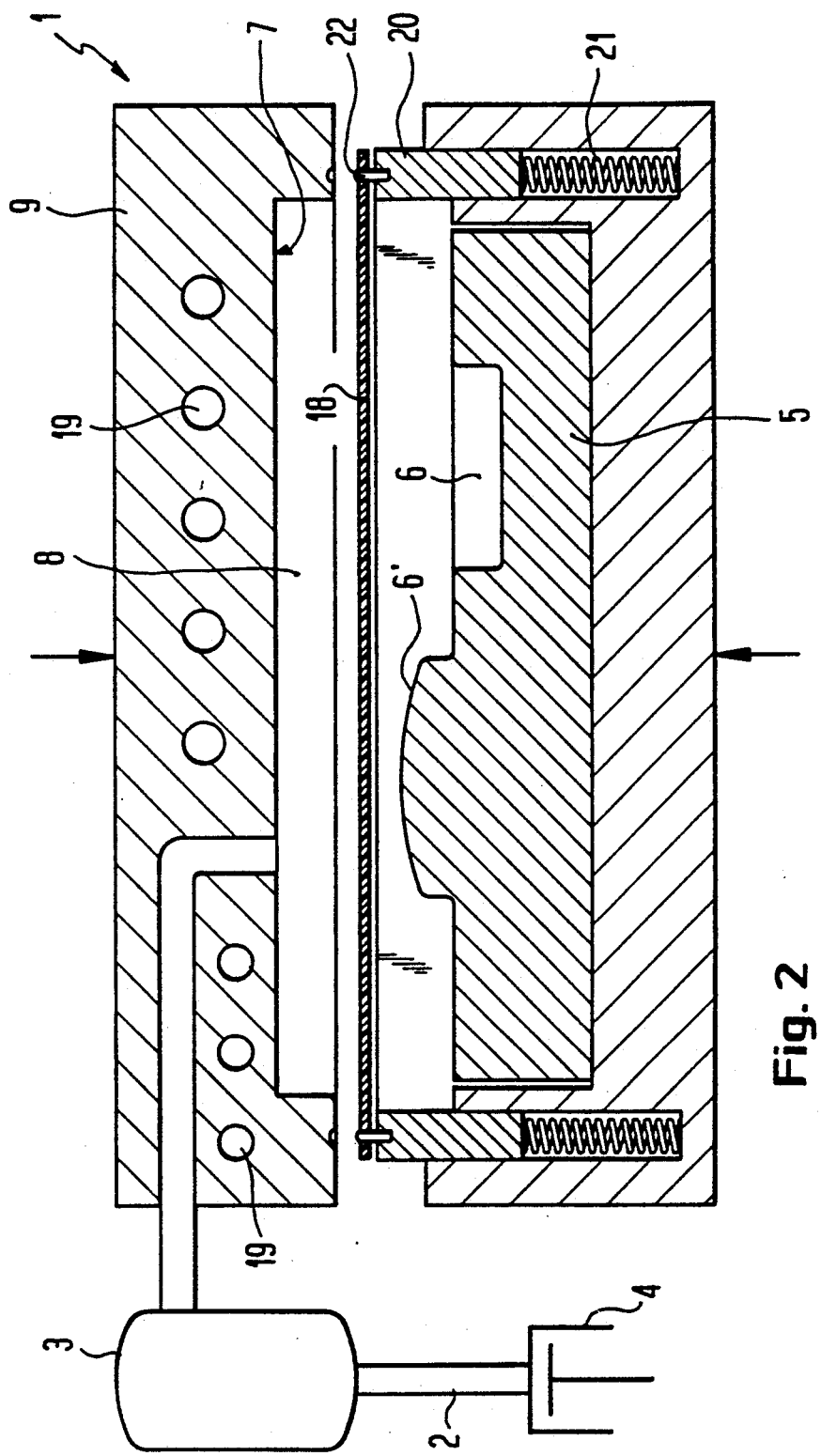
FIG. 2 is a schematic sectional view of a second embodiment of a mold for performing the high-pressure forming method according to the invention.

A bisphenol-A-based polycarbonate sheet having a thickness of 500 μm and a molecular weight of 30,000, with a softening temperature at 145° C., is negatively printed with a commercially available highly opaque black screen-printing ink based on a polyvinylchloride/acrylic resin compound so that two symbol fields remain free. One of the symbol fields is backed with a white and the other one with a red screen-printing ink on the same resinous basis as the highly opaque black ink. Then, the printed sheet is punched in a known manner such that the symbols will have the previously determined distance from the outer contour. The prepared plastic sheet is placed into the mold of FIG. 1 heated to 120° C. so that the colored side faces the pressure bell 7. When the mold is closed, the plastic sheet will be formed by means of compressed air at 150 bars. The cycle time for the forming process is less than 2 seconds. After opening of the mold the formed piece can be removed.

EXAMPLE 2

An unprinted polyimide sheet based on pyromellitic anhydride and 4,4'-dihydroxydiphenylether of 100 μm thickness and a molecular weight of 60,000, with a softening point above the decomposition temperature of 450° C., is placed in the mold. The mold cavity 6 has cubic shape with the dimensions 80×80×20 mm. Upon closing of the mold forming takes place by means of compressed air at a pressure of 200 bars. The cycle time is less than 2 seconds.

EXAMPLE 3

Figure 3:
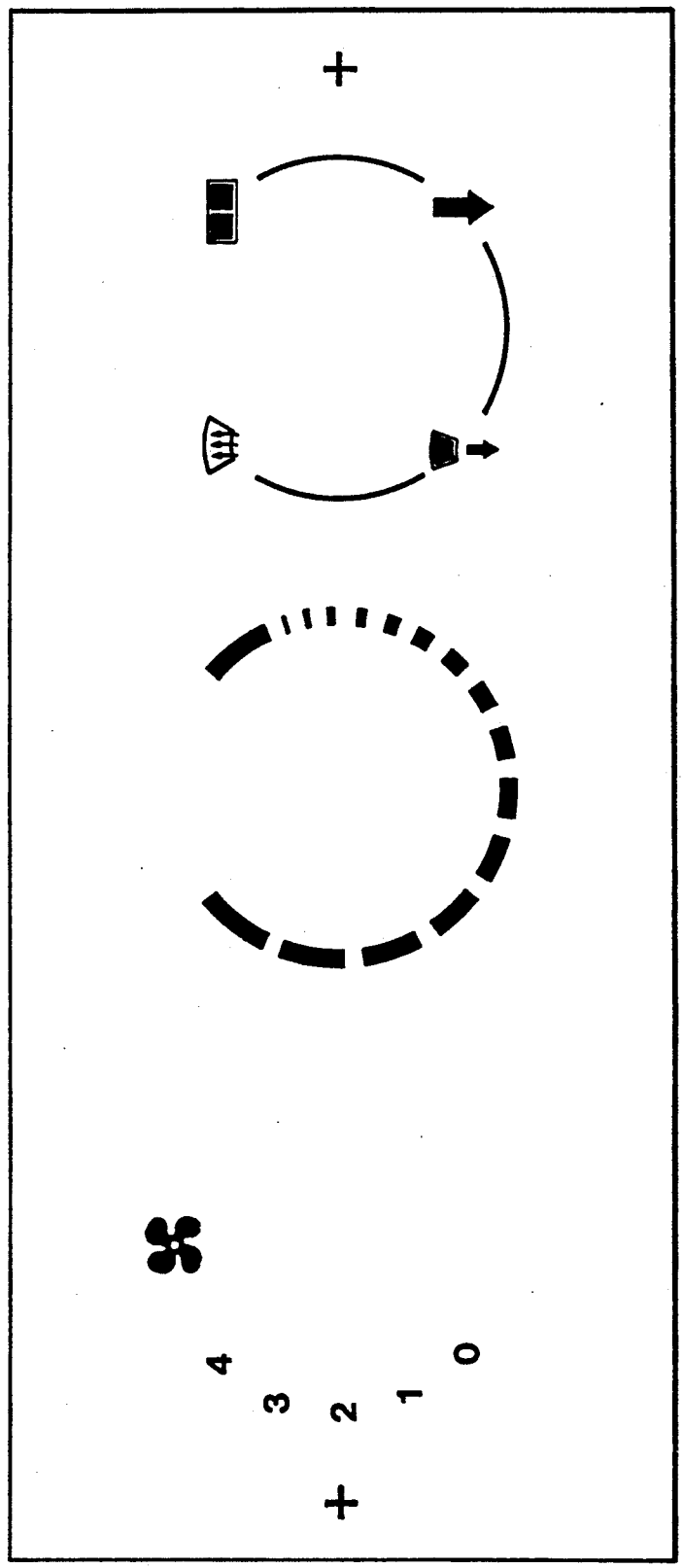
FIG. 3 is a plan view showing a planar sheet portion with printing provided thereon.
Figure 4:
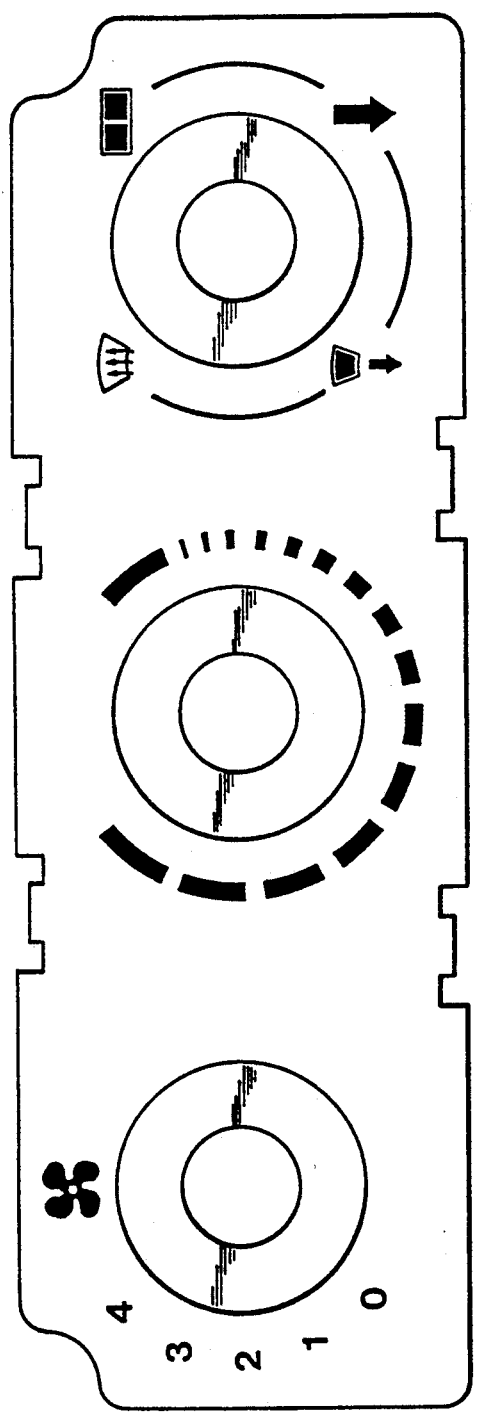
FIG. 4 is a plan view of a deep-drawn piece obtained from the planar sheet portion of FIG. 3 in accordance with the high-pressure forming method of the invention.
Figures 5, 6:
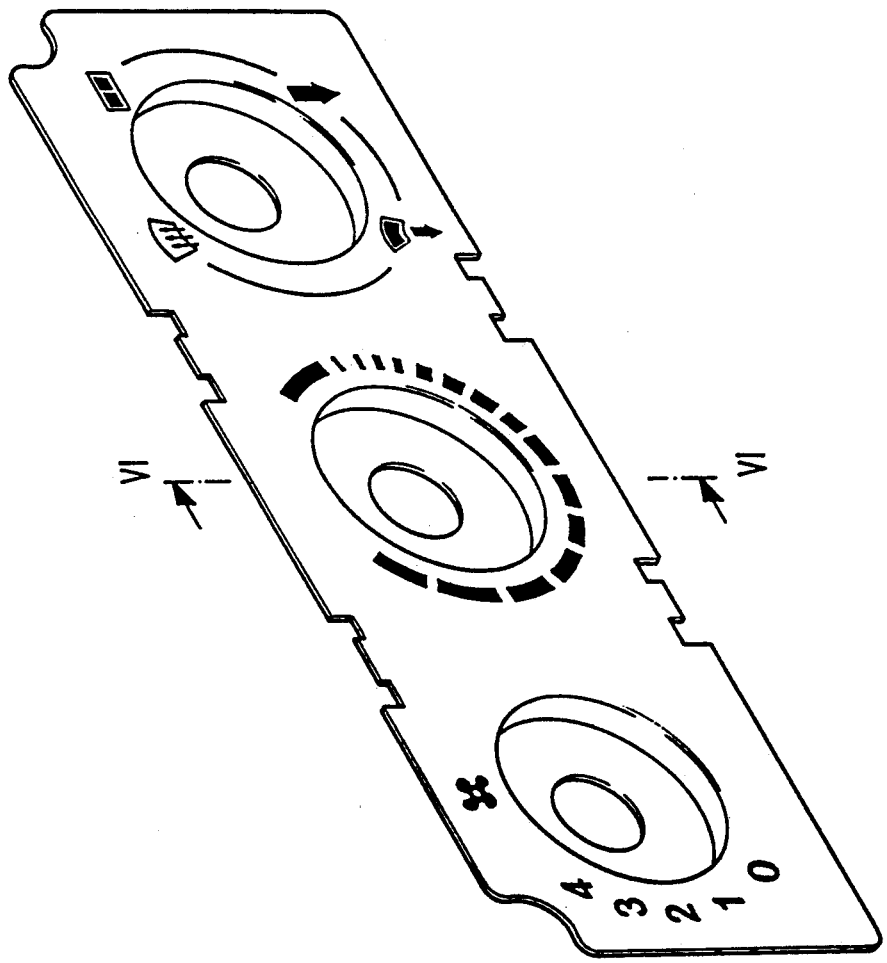
FIG. 5 is an oblique view showing the formed piece of FIG. 4.
FIG. 6 is a sectional view of the formed piece taken along the line IV—IV of FIG. 5.

The formed piece shown in FIG. 5 is used as a panel of a device for controlling heating and ventilating in an automotive vehicle. The starting material is a transparent, optionally matted polycarbonate sheet based on bisphenol A (MAKROLON obtained from BAYER AG, softening point about 150° C.) with a film thickness of 125 μm. Several ink layers are applied by screen printing in accordance with the intended symbols and pictures on the heating/ventilating panel. First, an opaque black ink is imprinted which leaves windows for the pictures. Thereafter, the windows are imprinted with different inks such as selected pictures in blue, white and red. The inks used for the colored printing in every case contain an ink carrier which will soften at about 100° C. All colored imprints are provided, partially in superposition, on the same surface of the sheet which is illustrated in its original size in FIG. 3.

Onto the printed surface of the planar sheet a further planar transparent sheet (MAKROLON, 125 μm) coated with hot-melt adhesive is placed in a void-free fashion. The obtained double sheet is heated to about 80° and 120° C., for example in a heating chamber or a passage provided with heat radiators. The double sheet heated to about 90° to 100° C. is placed in a defined arrangement in a conventional three-cavity mold which is adapted to the higher fluid medium pressure and has a cavity area of 240×340 mm. Each individual mold area of a size of 207×68 mm comprises three spaced cylindrical cavities having a diameter of 38 mm and a cavity depth of 6 mm.

The press is moved in the closing direction until the edge of the pressure bell tightly engages the top of the sheet and is closed at a hydraulic fluid pressure of 100 t. Compressed air heated to about 120° C. is injected through the pressure bell. Forming takes place abruptly. Immediately upon opening of the mold the deep-drawn panel may be removed because forming has been conducted far beneath the softening temperature of the polycarbonate material. Thickness variations on the finished deep-drawn pieces are less than 10%.

From the obtained deep-drawn panel the individual (three) sections are punched. Each section of the formed piece is placed in an injection mold and injection-reinforced with transparent plastic material up to a layer thickness of 3 mm. The injected composition also is a polycarbonate material (MAKROLON). A rigid, dimensionally stable formed plastic piece is obtained which is provided with multi-colored printing. The colored printing is provided "inside" the wall of the formed body and is spaced from the surface by a plastic film having a thickness of about 120 μm so that it is protected from wear and damage.

Figure 7:
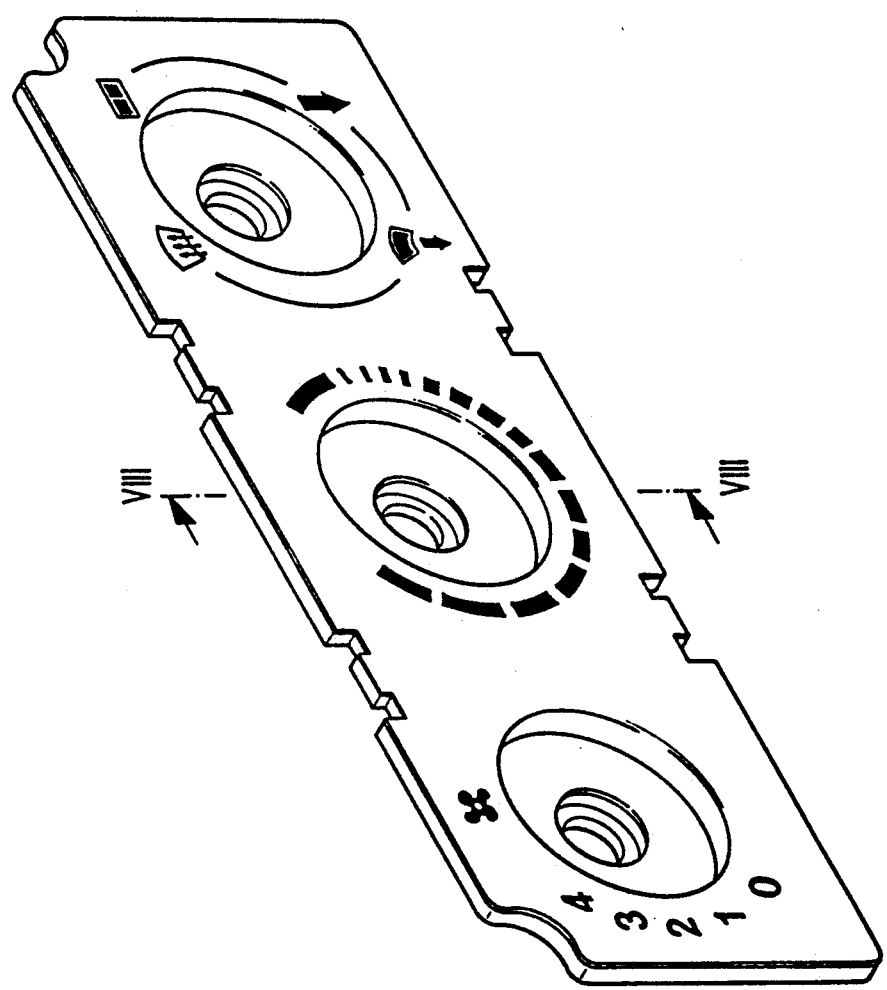
FIG. 7 is an oblique view of a formed plastic piece according to the invention which can be obtained by injection-backing the formed piece of FIGS. 4, 5 and 6.
Figure 8:
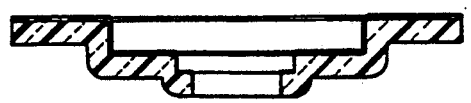
FIG. 8 is a sectional view of the formed piece taken along the line VI—VI of FIG. 7.

FIGS. 5 and 6 are an oblique view and a sectional view, respectively, of the thin-walled formed plastic piece obtained by deep-drawing. FIGS. 7 and 8 are an oblique view and a sectional view, respectively, of the formed plastic piece after injection-reinforcing with a transparent plastic layer of about 3 mm.

EXAMPLE 4

Figure 9C:
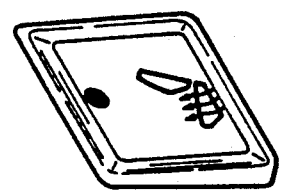
FIGS. 9a, 9b, 9c are respective oblique views showing another example of a deep-drawn piece according to the invention in the form of a switch cover.
Figure 9B:
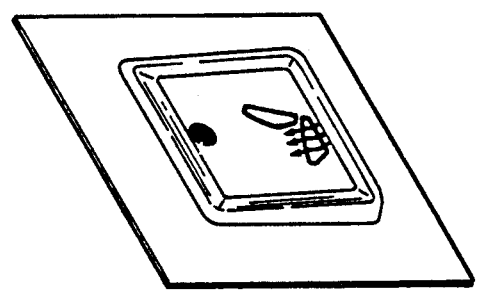
Figure 9A:
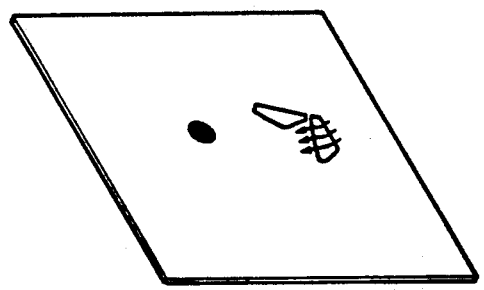

FIGS. 9a, 9b and 9c are respective oblique views illustrating the various stages for producing a formed plastic piece to be used as switch cover. Again, the figures are true copies of the originals. Although pictorial symbols are provided on a sheet portion which during the deep-drawing process is deformed into the mold cavity, there is practically no distortion and/or other deterioration of the pictorial mask printed on the planar sheet.

We claim:

1. A method of manufacturing a deep-drawn formed plastic piece comprising the steps of:
   providing a cold-stretchable sheet material with a coating selected from the group of an ink film, an ink imprint, a vacuum evaporated metallic thin film, and an electrically conductive varnish film; and
   treating said coated sheet with a fluid pressure medium having a fluid medium pressure of more than 20 bars, and at an operating temperature lower than the softening temperature of the sheet material, to deform the sheet material isostatically in order to obtain the deep-drawn formed coated plastic piece.

2. A method according to claim 1, wherein treating of the sheet material is conducted during a period of time of less than 5 seconds.

3. A method according to claim 1, wherein treating of the sheet material is conducted abruptly.

4. A method according to claim 1, wherein a dual-layer sheet material is formed in a single step, and wherein the coating is provided on an inner surface of the dual-layer sheet material.

5. A method according to claim 1, wherein the cold-stretchable sheet material has a thickness of between 40 and 2000 μm.

6. A method according to claim 1, wherein a cold-stretchable sheet material comprising plastic materials based on polycarbonates, polyamides, polyimides, polyesters, organic cellulose esters, polyarylates or polyfluorohydrocarbons is formed.

7. A method according to claim 1, wherein treating takes place against a resiliently supported wall portion of a mold cavity.

8. A method according to claim 1, wherein a thin-walled deep-drawn piece is obtained after forming and that piece is subsequently injection-reinforced with a plastic composition.

9. A method according to claim 1, wherein the operating temperature is above the glass transition temperature of the coated sheet material.

10. A method according to claim 9, wherein the operating temperature is above the softening temperature of the coating material.

11. A method according to claim 10, wherein treating of the sheet material is conducted abruptly.

12. A method according to claim 1, wherein the operating temperature is between 80° and 130° C.

13. A method according to claim 12, wherein the fluid medium pressure is between 50 and 300 bars.

14. A method according to claim 13, wherein the cold-stretchable sheet material has a thickness of between 40 and 2000 μm.

15. A method according to claim 13, wherein treating takes place against a resiliently supported wall portion of a mold cavity.

16. A method of manufacturing a deep-drawn formed plastic piece, comprising:
   providing a cold-stretchable substantially flat sheet material with a coating, with at least a portion of said coating forming a graphic representation; and
   applying a fluid pressure medium to said coated cold-stretchable sheet material at an operating temperature below the softening temperature of the sheet material and at a fluid medium pressure of more than 20 bars whereby deforming the sheet material isostatically in order to obtain said deep-drawn formed plastic piece without any significant distortion to said graphic representation.

17. A method according to claim 16, wherein the fluid medium pressure is between 60 and 250 bars.

18. A method according to claim 16, wherein treating of the sheet material is conducted during a period of less than 2 seconds.

19. A method according to claim 16, wherein treating takes place against a resiliently supported wall portion of a mold cavity.

20. A method according to claim 16, wherein coating is selected from one of the following group of coatings, an ink film, an ink imprint, a vacuum evaporated metallic thin film and an electrically conductive varnish film.

* * * * *